United States Patent
Walter

(10) Patent No.: US 7,264,564 B2
(45) Date of Patent: Sep. 4, 2007

(54) CONE DISC INFINITELY-VARIABLE GEARBOX

(75) Inventor: Bernhard Walter, Oberkirch (DE)

(73) Assignee: Luk Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 11/016,035

(22) Filed: Dec. 17, 2004

(65) Prior Publication Data

US 2005/0192697 A1    Sep. 1, 2005

Related U.S. Application Data

(63) Continuation of application No. PCT/DE03/01908, filed on Jun. 10, 2003.

(30) Foreign Application Priority Data

Jun. 17, 2002   (DE) ................. 102 26 913

(51) Int. Cl.
*F16H 63/00* (2006.01)
*F16H 61/00* (2006.01)

(52) U.S. Cl. .................. 474/28; 474/18; 474/19; 474/8

(58) Field of Classification Search ........... 474/18–19, 474/20–21, 23, 46, 8; 477/45–50
See application file for complete search history.

(56) References Cited

U.S. PATENT DOCUMENTS 4,583,423 A * 4/1986 Hahne ....................... 475/136
4,717,368 A * 1/1988 Yamaguchi et al. .......... 474/28
5,342,247 A * 8/1994 Adriaenssens ................ 474/18
6,015,359 A * 1/2000 Kunii ........................ 474/18
6,089,999 A    7/2000 Imaida et al. ................ 474/18
6,234,925 B1   5/2001 Walter ......................... 474/18
6,336,878 B1   1/2002 Ehrlich et al. ................ 474/28
6,585,613 B1   7/2003 Walter et al. .................. 474/8

FOREIGN PATENT DOCUMENTS

| DE | 198 57 709 A1 | 6/1999 |
| DE | 198 57 710 A1 | 6/1999 |
| DE | 199 21 750 A1 | 11/1999 |
| JP | (08-14347 A * | 1/1996 |

* cited by examiner

*Primary Examiner*—Marcus Charles
(74) *Attorney, Agent, or Firm*—Alfred J. Mangels

(57) ABSTRACT

A cone disc infinitely-variable gearbox including a shaft, a cone disc preferably embodied in one piece with the shaft, a cone disc connected to the shaft in a non-rotating axially-displaceable manner, a bearing ring axially fixed onto the shaft at a separation from the rear face of the displaceable cone disc, a radial inner pressure chamber formed between the cone disc and the bearing ring, which may be altered in the axial direction and which may be pressurized with pressure medium, through an opening embodied in the shaft, for displacement of the cone disc and a radial outer pressure chamber which may be altered in the axial direction and which may be pressurized with pressure medium, through a further opening embodied in the shaft, for displacement of the cone disc.

13 Claims, 15 Drawing Sheets

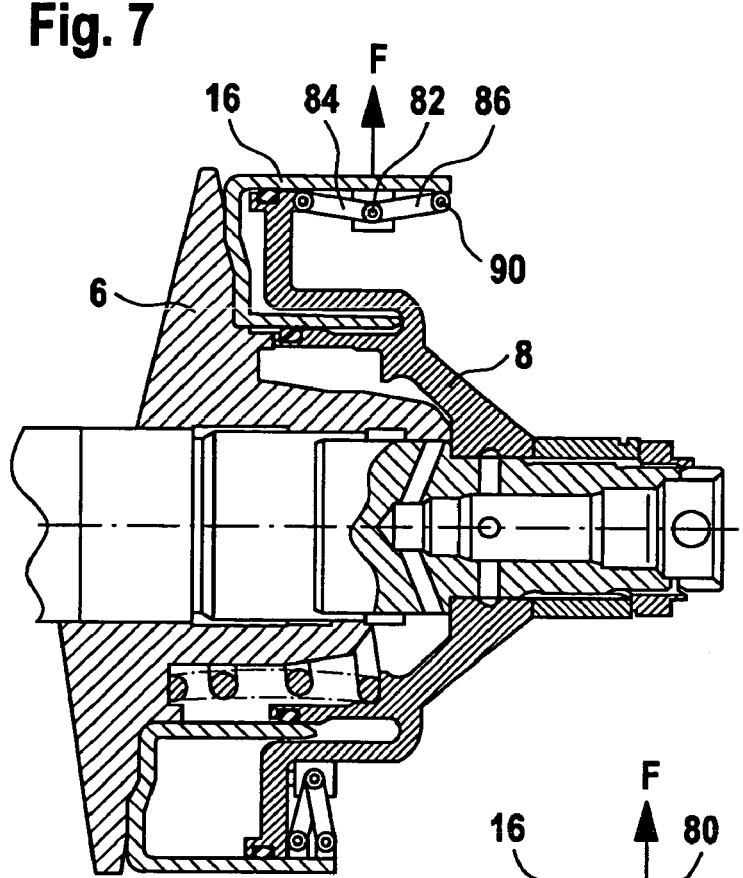
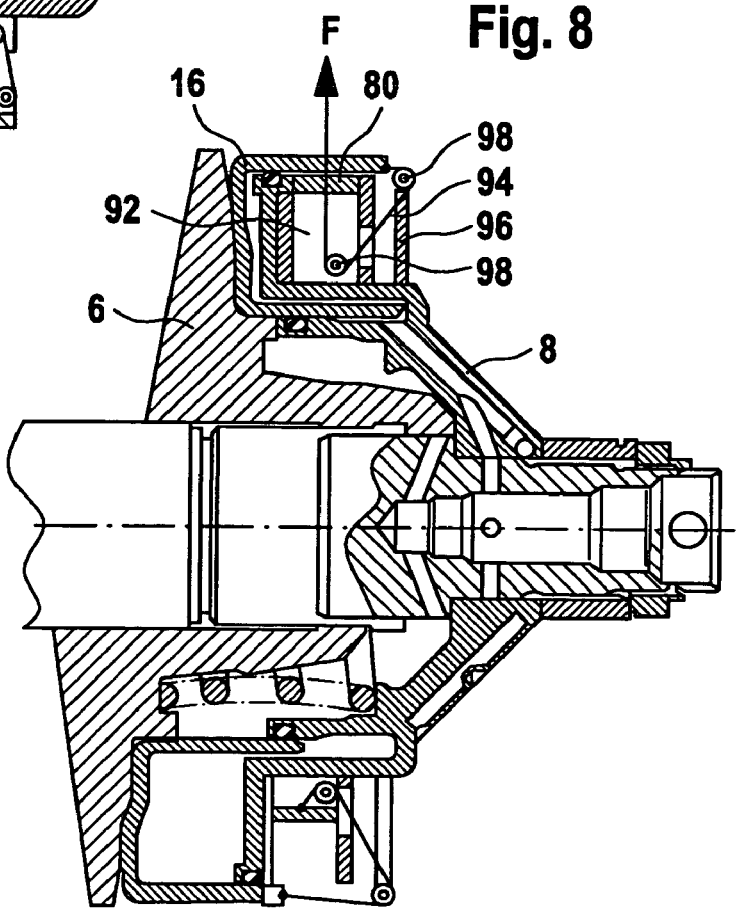

CONE DISC INFINITELY-VARIABLE GEARBOX

CROSS-REFERENCE TO RELATED APPLICATION

This is a continuation of International Application Ser. No. PCT/DE03/01908, with an international filing date of Jun. 10, 2003, the entire contents of which is hereby incorporated by reference to the same extent as if fully rewritten.

BACKGROUND OF THE INVENTION

1. Field of the Invention

The invention relates to a cone pulley CVT, a method for defining the spread width between the two cone pulleys of such a transmission, and a method for towing such a transmission.

2. Description of the Related Art

Recently the use of cone pulley CVTs in passenger cars has increased, due to the successful development of such transmissions with sufficient torque transmission capability, good acoustic properties and a long service life.

As the use of cone pulley CVTs increases, the significance of both cost and road capability increases.

It is the purpose of the invention to design cone pulley CVTs that are less costly and have better road capability.

SUMMARY OF THE INVENTION

A first solution is achieved with a cone pulley CVT that includes a shaft, a cone pulley that is preferably designed to form a single piece with the shaft, a cone pulley that is non-rotatably and axially movably connected to the shaft, a support ring that is axially immovably mounted to the shaft at a distance from a rear side of the axially movable cone pulley, a radially inner and axially variable pressure chamber that is formed between the cone pulley and the support ring and that can be pressurized via a passageway in the shaft for the purpose of moving the cone pulley, and a radially outer pressure chamber that is axially variable and can be pressurized via a further passageway for the purpose of moving the cone pulley, wherein the further passageway in the shaft is connected to the radially outer pressure chamber via a passageway in the axially movable cone pulley.

The further passageway in the shaft advantageously extends through an annulus located between the axially movable cone pulley and the shaft, to the passageway in the axially movable cone pulley.

Toward the axially movable cone pulley, the radially outer pressure chamber is bordered by the floor of an annular wall structure with an inner and an outer axially extending annular wall, the annular walls being sealed and axially movable relative to the support ring, and the passageway in the axially movable cone pulley extending through an opening in the annular wall structure to the radially outer pressure chamber.

The support ring advantageously includes a radially inner and a radially outer ring component, while areas of the radially outer ring component border the radially outer pressure chamber.

The ring components may be designed to form an integral component.

As an alternative, the ring components may be formed sheet-metal components that are press-fit connected to one another.

In one advantageous embodiment, the radially outer ring component is form-fittingly pushed onto the radially inner ring component when the radially outer pressure chamber is pressurized.

A coil spring without surface-ground coil ends may be positioned between the radially inner ring component and the axially movable cone pulley.

It is also advantageous to design the axially movable cone pulley, the support ring, the outer annular wall and the outer ring component identically in construction for the input and the output sides of the transmission, as this will reduce the number of different components and lower production costs.

The identical design will lead to another benefit, namely that the hood is mounted on the input side or on the output side.

This, however, requires that the end of the annular wall be provided with an appropriate form-fitting or force-locking component where the hood may be mounted.

Another solution to the task of the present invention is achieved by means of a cone pulley CVT that includes a pair of cone pulleys with a shaft, a cone pulley that preferably is integral with the shaft, a cone pulley that is non-rotatably connected to the shaft in an axially movable manner, a support ring that is axially immovably mounted to the shaft at a distance from a rear side of the axially movable cone pulley, a minimum of one pressure chamber that is formed between the support ring and the rear side of the axially movable cone pulley and that, by being pressurized with a hydraulic medium, allows the axially movable cone pulley to move, and an annulus in a push fit for movable sealing between the cone pulley and a stationary component that is equipped with a seal ring, the annulus turning into an annular gap toward one side and over a bevel, turning into a sealing gap toward the opposite side.

With regard to cost cutting, a method for defining the spread width of a pair of cone pulleys in a cone pulley CVT is advantageous, wherein the pair of cone pulleys includes one cone pulley that preferably is integral with a shaft and one cone pulley that is non-rotatably connected to the shaft in an axially movable manner, with the latter cone pulley being movable toward the other cone pulley by means of pressurization of a minimum of one pressure chamber that is located between its rear side and a support ring that is rigidly mounted to the shaft and the axially movable cone pulley, at its maximum distance from the other cone pulley, resting on the support ring, in which method the support ring, without being in contact with a radial shaft stop with a movable cone pulley resting on it, is mounted axially and non-rotatably to the shaft in such manner that a predetermined maximum spacing between the cone pulleys is maintained.

A cone pulley CVT according to the present invention includes a shaft, one cone pulley preferably designed to be integral with the shaft, one cone pulley that is non-rotatably connected to the shaft and in an axially movable manner, a support ring that is axially immovably mounted to the shaft at a distance from the rear side of the axially movable cone pulley, wherein the axially movable cone pulley is movable toward the other cone pulley via pressurization of a minimum of one pressure chamber that is formed between the rear side of the axially movable cone pulley and the support ring, and the axially movable cone pulley, at its farthest position away from the other cone pulley, rests on the support ring which, without being in contact with a radial shaft stop and the movable cone pulley resting on it, is axially immovably mounted to the shaft in such manner that a predetermined maximum spacing between the cone pulleys is maintained.

The support ring is advantageously welded to the shaft.

In an additional advantageous embodiment, the support ring is axially form-fittingly mounted to the shaft by a minimum of one component, which engages in a recess located in the outer circumference of the shaft and the inner circumference of the support ring.

Another cone pulley CVT according to the present invention includes a shaft, a cone pulley that advantageously is integral with the shaft, a cone pulley that is non-rotatably connected to the shaft and in an axially movable manner, a support ring at a distance from the rear side of the axially movable cone pulley, a minimum of one pressure chamber that is formed between the support ring and the rear side of the axially movable cone pulley, wherein pressurization of said pressure chamber with hydraulic medium pressure allows the axially movable cone pulley to move toward the other cone pulley, and a minimum of one mass body that is arranged in such manner, and acts together with both the axially movable cone pulley and the support ring in such a manner that, due to the centrifugal force acting upon it, a force is exerted on the movable cone pulley which counteracts the force resulting from the hydraulic pressure.

The mass body may be part of a lever, which is positioned between a component that is rigidly connected to the axially movable cone pulley and protrudes beyond the support wall on its far side to the movable cone pulley, and the support ring, and, with increasing shaft speed, presses the axially movable cone pulley toward the support ring.

In another embodiment, the mass body is connected to the axially movable cone pulley and the support ring by a minimum of one cable, in such manner that with increasing shaft speed, the axially movable cone pulley is pulled toward the support ring.

In another variation, the mass body is placed in a point of articulation between two levers, of which one is pivotally connected to a component that is rigidly connected to the axially movable cone pulley and that protrudes beyond the support wall on its far side to the axially movable cone pulley, and the other lever is connected to the support ring, so that with increasing shaft speed, the axially movable cone pulley is pressed toward the support ring.

In a further embodiment, the mass body is movable along an inclined plane that is rigidly connected to the support ring or to the axially movable cone pulley and that runs obliquely to the axial direction, in such manner that, with a radially outward motion of the mass body, the axially movable cone pulley is pushed toward the support ring.

In another embodiment, the mass body includes two gears that are adjacent to the shaft and parallel to its axial direction, and that are rotatable in a circumferential direction, relative to the axial direction, and that intermesh with one another and with each of the gear tooth systems, one being obliquely mounted to the support ring and the other being obliquely mounted to the axially movable cone pulley, and with radial motion away from the axis of the shaft, the gears force the axially movable cone pulley toward the support ring.

Advantageously, several mass bodies are mounted at a distance from each other around the shaft.

A further solution to the task of this invention is achieved with a cone pulley CVT that includes two pairs of cone pulleys that are positioned at a radial distance from one another and parallel to one another, each including a shaft, one cone pulley that preferably is integral with the shaft, one cone pulley that is non-rotatably connected to the shaft and in an axially movable manner, an axially stationary support ring that is mounted to the shaft at a distance from the rear side of the axially movable cone pulley, a minimum of one pressure chamber that is formed between the support ring and the rear side of the axially movable cone pulley, wherein pressurization of the pressure chamber with hydraulic pressure allows the axially movable cone pulley to move, and an endless torque-transmitting means that wraps around both cone pulley pairs while the pressure chamber may be pressurized in such manner that the spacings between the cone pulleys of either cone pulley pair, and hence the radii along which the endless torque-transmitting means runs on the tapered surfaces of the cone pulley pairs, change in the opposite direction. Furthermore, the cone pulley CVT includes a mechanism which, in case of hydraulic pressure failure, separates the cone pulleys of at least one cone pulley pair in such manner that the inner circumference of the endless torque-transmitting means comes in contact with an inner axially parallel peripheral area of the cone pulley pair.

Advantageously, the inner axial peripheral area of the cone pulley CVT is provided with an anti-friction coating.

The cone pulley pair that separates in case of pressure failure is preferably the one on the output side.

The mechanism for separating the cone pulleys may include a spring.

A further solution to the task of the present invention is achieved with a method for towing a cone pulley CVT with two cone pulley pairs that are placed at a radial distance from one another and parallel to one another, each including one shaft, one cone pulley that preferably is integral with the shaft, one cone pulley that is non-rotatably connected to the shaft and in an axially movable manner, an axially stationary support ring that is mounted to the shaft at a distance from the rear side of the axially movable cone pulley, a minimum of one pressure chamber that is located between the support ring and the rear side of the axially movable cone pulley, wherein pressurization of the same with a hydraulic medium allows the axially movable cone pulley to move, and an endless torque-transmitting means that wraps around both cone pulley pairs, wherein the pressure chamber may be pressurized in such manner that the spacings between the cone pulleys of either pair of cone pulleys, and hence the radii along which the endless torque-transmitting means runs on the tapered surfaces of the cone pulley pairs, change in the opposite direction. In this method, during towing of a cone pulley CVT, the cone pulleys of at least one cone pulley pair separate in such manner that the inner circumference of the endless torque-transmitting means comes in contact with an inner axially parallel peripheral area of the cone pulley pair.

BRIEF DESCRIPTION OF THE DRAWINGS

In the following description, embodiments of the invention are discussed based on schematic drawings, and more detail is provided:

FIGS. 7 to 17 show different embodiments of the mechanical centrifugal force mechanism.

DESCRIPTION OF THE PREFERRED EMBODIMENTS

Figure 1:
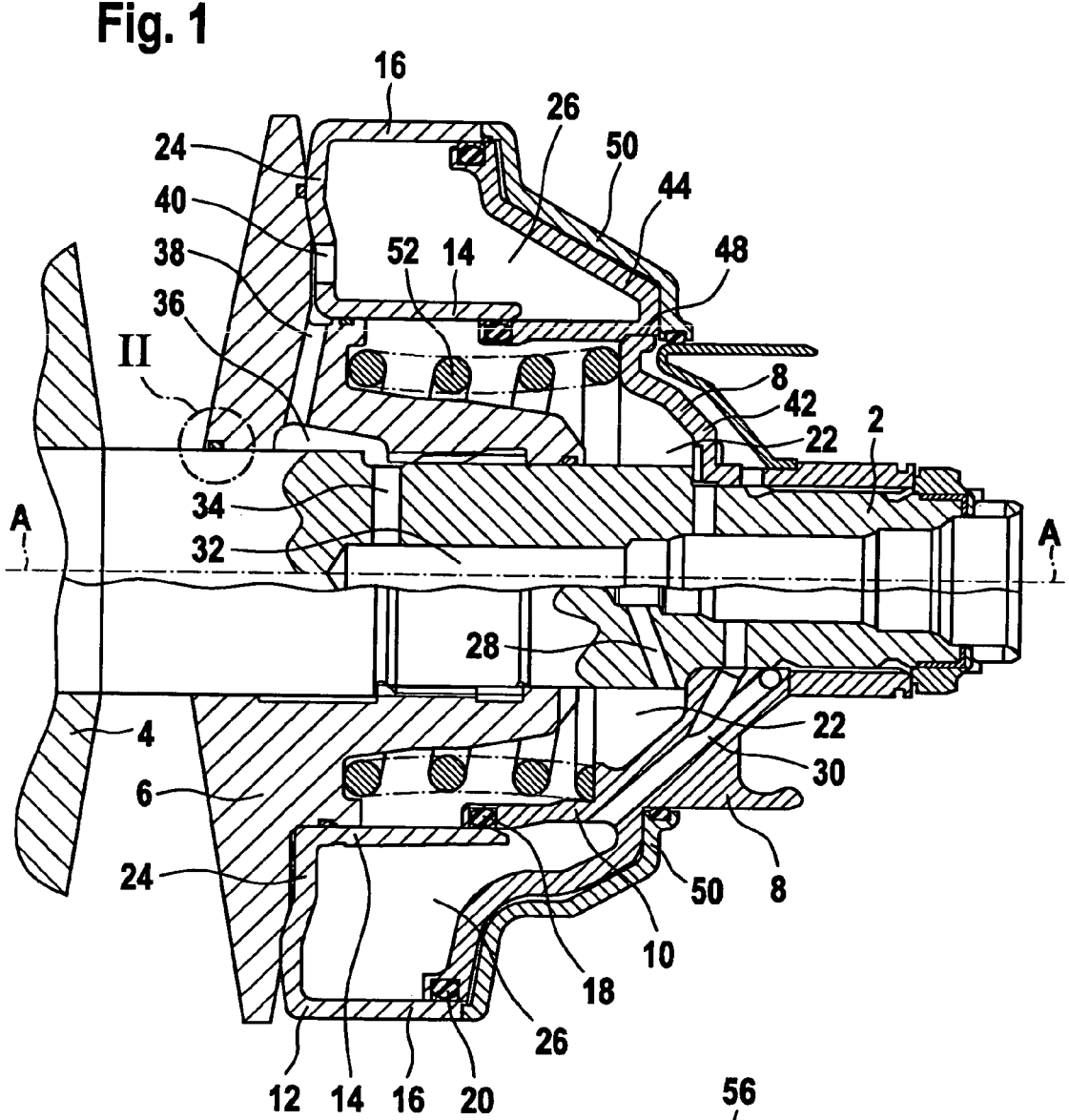
FIG. 1 is a longitudinal sectional view through part of a cone pulley CVT, which to some extent is conventional, while other parts are according to the invention.

FIG. 1 is a cutaway view of a cone pulley pair of a cone pulley CVT axial longitudinal section, wherein the lower half of FIG. 1 shows a conventional design and the upper half shows a design according to the invention. A shaft 2 of a cone pulley pair of a cone pulley CVT, having an axis A-A, is designed to form a single component with a cone pulley 4. At a distance from the cone pulley 4, another cone pulley 6 is positioned on the shaft A in a non-rotatable and an axially movable manner. At a distance from the rear side of the cone pulley 6 a support ring 8 is rigidly connected to the shaft 2, from which, in a radially medial area, an axially oriented cylindrical annular wall 10 protrudes toward the cone pulley 6. In the radially outer portion of the rear side of the cone pulley 6, an annular wall structure 12 rests against or is attached to it, which includes cylindrical annular walls 14 and 16 that are radially inside and outside and that extend axially. The inner annular wall 14 is in sealed sliding contact with the annular wall 10 by means of a seal ring 18 and the outer annular wall 16 is in sealed sliding contact with the outer circumference of the support ring 8 by means of a seal ring 20. By this, an inner pressure chamber 22 is formed between the shaft 2 and the cone pulley 6 as well as the annular walls 10 and 14, and an outer pressure chamber 26 is formed between the annular walls 10, 14, and 16, the floor 24 of the wall structure 12, and the radially outer portion of the support ring 8. The supply of pressurizing medium to the inner pressure chamber 22 is provided through a passageway 28 in the shaft 2. Pressurization of the outer pressure chamber 26 takes place through passageways in the shaft 2 and a channel 30 that runs through the support ring 8. As the design and function of such assembly are known, they will not be discussed herein any further.

Due to the channel 30, the support ring 8 is a relatively complex component, in most cases a forged component, which must be sturdy enough to function as a support wall for the pressure chambers and the cone pulley 6 accordingly, and must also afford sufficient volume so that the channel 30, which is usually branched, may be formed.

The difference between the upper and the lower halves of FIG. 1 is that in the upper half the supply of pressurizing medium to the radially outer pressure chamber 26 is provided through passageways 32 and 34 in the shaft 2 via an annulus 36 through a channel or passageway 38 in the cone pulley 6, and from there through an opening 40 in the floor 24 of the wall structure 12, which leads into the outer pressure chamber 26. It is understood that the annulus 36, which is formed by recesses in the shaft 2 and/or the cone pulley 6, must be of such axial length that the connection is maintained from the passageway 34 to the passageway 38 along the entire travel distance of the cone pulley 6. The passageway 38 may be a transverse drill hole.

The supply of pressurizing medium to the outer pressure chamber 26 being provided through the axially movable cone pulley 6 offers great design freedom with regard to the support ring 8. In the illustrated example at location 48, the support ring 8 includes two formed sheet metal pieces 42 and 44, which are, for example, pressed together in the same manner as they come out of the forming tool. The seat surfaces mating with the annular walls 14 and 16 of the wall structure 12 may be machined while mounted. FIG. 1 does not show that, due to the pressure in the pressure chamber 26 during operation, the formed sheet-metal piece 44 is continuously pushed against the formed metal-sheet piece 42 (a form fit to the right side exists in the contact area with regard to an axial motion of the formed sheet-metal piece 44 according to FIG. 1), so that it cannot become detached.

The two formed sheet-metal pieces may be joined to one another via spot welding. Alternatively, the support ring 8 may be formed as a single piece or designed otherwise.

As the support ring 8 does not have a pressure medium passageway, great design freedom exists, resulting in low costs.

At this point, reference is made to a hood 50 which extends from the outer annular wall 16 and forms a centrifugal oil chamber between itself and the support ring 8, where hydraulic pressure builds as speed increases, counteracting the pressure in the pressure chambers 22, 26 with respect to the movement of the cone pulley 6.

A further advantage of the invention, as illustrated in the upper half of FIG. 1, is that because of the increase in available space, a coil spring 52 without surface-ground coil ends may be used, which functions as a pressure spring and is located in the radially inner pressure chamber 22.

Figure 2:
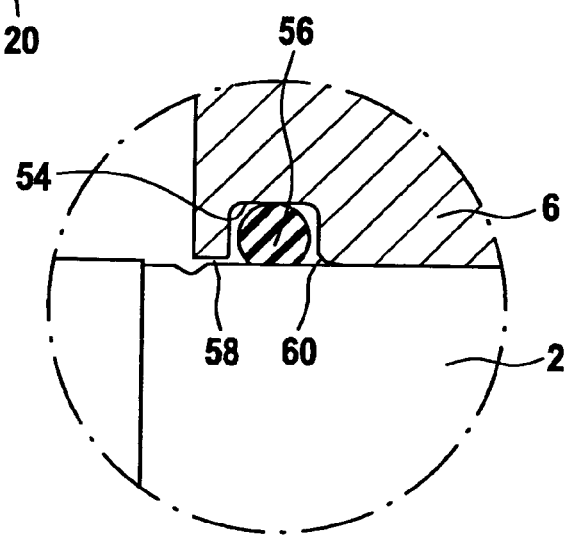
FIG. 2 is a detail view of region 11 in FIG. 1.

FIG. 2 is an enlargement of the cutaway view 11 of FIG. 1 and shows the design of a push-fit between the axially movable cone pulley 6 and the shaft 2. Inside the inner circumferential area of the cone pulley 6 there is an annular groove 54, in which a seal ring 56, for example an O-ring, is placed. According to FIG. 2, the inner circumferential area of the cone pulley 6 is somewhat recessed on the left of the annular groove 54, so that an annular gap 58 remains, where no mechanical component exists between the cone pulley 6 and the shaft 2. On the far side of the annular gap 58, the annular groove 54 passes over a bevel 60 into its cylindrical inner circumferential area, wherein a continuous flow of leakage pressure medium flows through the section b of the unit between the cone pulley and the shaft, preventing wear. The purpose of the bevel 60 is to shift the support force between the cone pulley 6 and the shaft 2 somewhat to the right of the bevel 60, to eliminate the risk of material chipping in the area of the edge.

It is understood that the push-fit may be modified to the effect that the annular groove 54 is designed only in the shaft 2 or in the shaft 2 as well as the cone pulley 6, wherein in the Fig. the annular gap 58 is located to the left of the formed annulus that accommodates the seal ring, and one or two bevels are located on the right side in transition to the contact surfaces.

The sliding seat design according to FIG. 2 may also be applied to other push-fits as shown in FIG. 1 and to any hydraulically operated cone pulley CVT.

Figure 3:
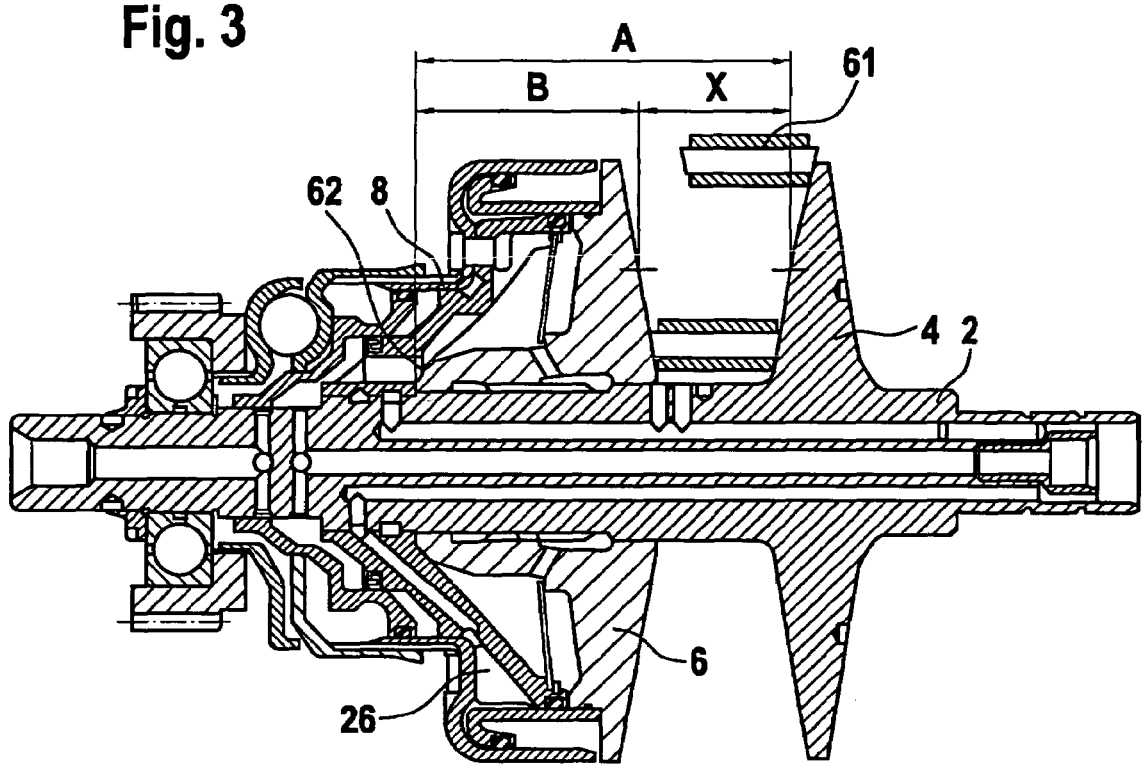
FIG. 3 is a longitudinal sectional view through part of a cone pulley CVT, which to some extent is conventional, while other parts are according to the invention.

One problem that arises with respect to conventional cone pulley CVTs is discussed with reference to FIG. 3. The design of the cone pulley pair in FIG. 3 is identical to the one in the lower half of FIG. 1, and components of a like function have been assigned the same previous reference designations. FIG. 3 shows an additional endless torque-transmitting means 61 in its radially outermost and its radially innermost positions. An important design dimension is the so-called spread width X, i.e., the maximum distance between the tapered surfaces of the cone pulleys 4 and 6 in the radially medial area of the tapered surfaces. This spread width X is defined by the difference of measures A and B. Measure A is the axial distance between a radial step 62 on the shaft and the radial center of the tapered surface of the axially fixed cone pulley 4. The other measure B is the distance between the step 62 and the radial center of the tapered surface of the axially movable cone pulley 6. Measure B equals the total axial thickness of the cone pulley 6, which, with the greatest possible distance between the cone pulleys, rests against the support ring 8, which is pressed onto the shaft 2 seated to the step 62, and is fixed in this position. During transmission manufacture, tolerances occur in the production of the cone pulleys and the shaft, affecting the measure X. It is understood that the spread width may be defined at a location other than the radial center.

Figure 4:
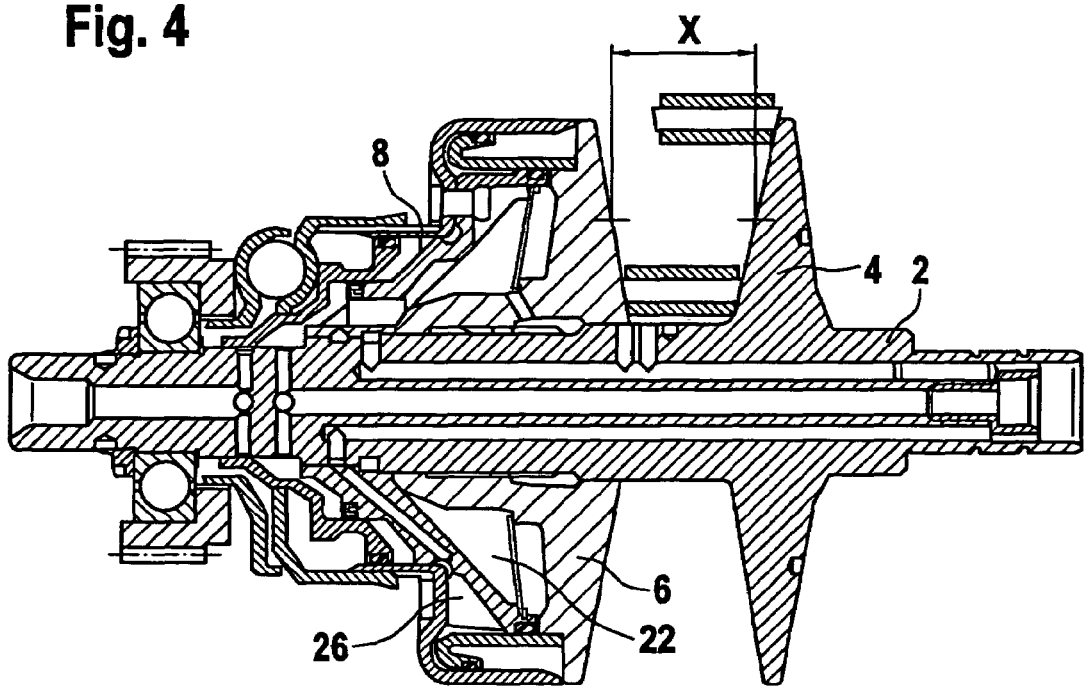
FIG. 4 is a longitudinal sectional view through part of a cone pulley CVT modified according to the invention as shown in FIG. 3.

According to the invention, the shaft 2 is therefore designed without the step 62, as shown in FIG. 4, and the support ring 8 with the movable cone pulley 6 resting against it is pressed onto the shaft 2 to such an extent that the measure X is maintained and fixed in this position on the shaft 2.

Figure 5:
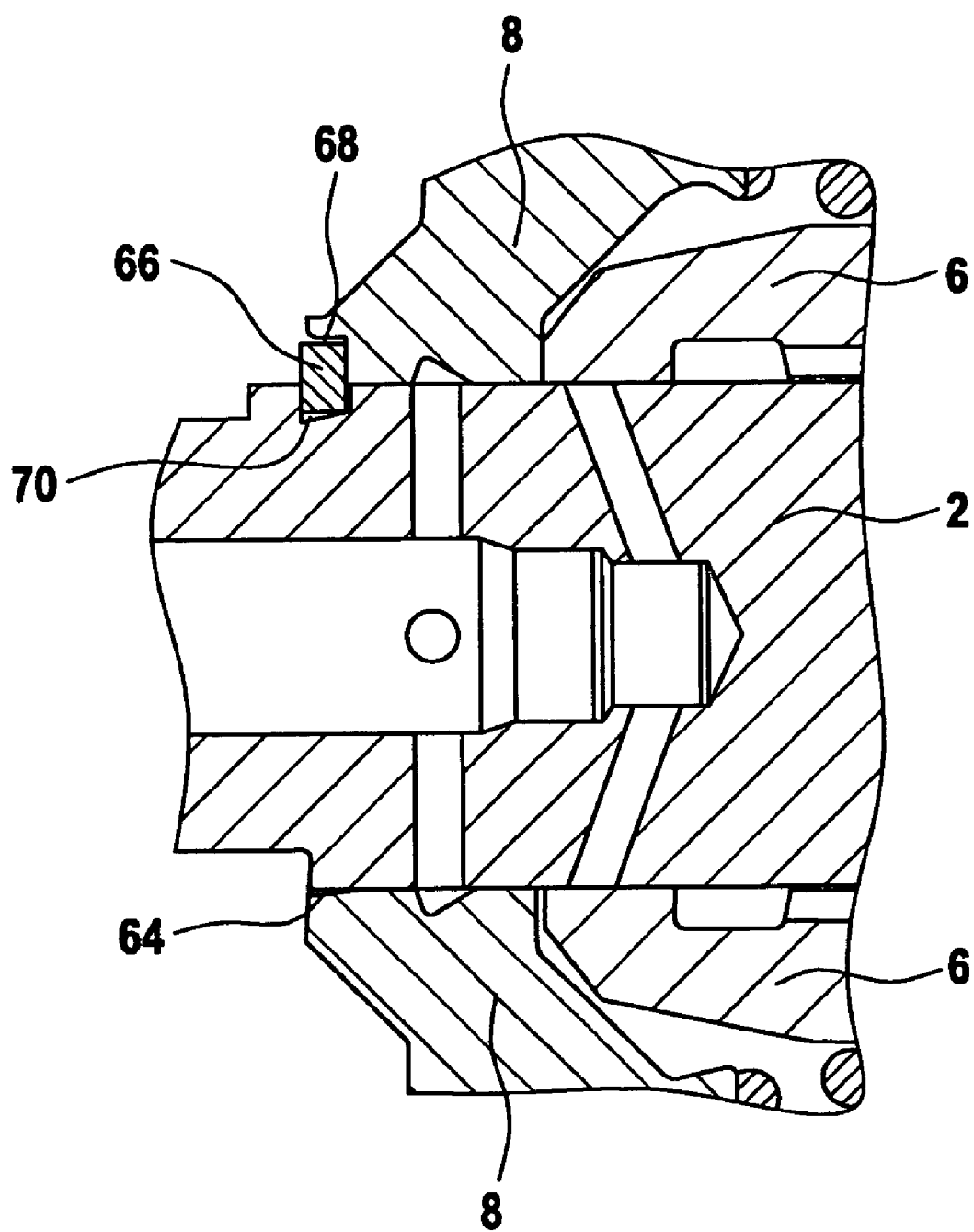
FIG. 5 shows two different embodiments (upper and lower half) of a detail of a portion of the embodiment shown in FIG. 4, FIGS. 6a to 6h show different views of a part of a cone pulley CVT in a first embodiment of a mechanical centrifugal force mechanism.

Mounting of support ring 8 may be effected via welding 64 (FIG. 5) or by means of a single-piece or multi-component lock ring 66, which engages in corresponding recesses or grooves 68, 70. The axial thickness of the lock ring/s is determined as the result of an appropriate measurement, so that a ring of the appropriate thickness or several rings of which the thickness adds to the relevant measure is/are used.

The solution to another problem existing with cone pulley CVTs is discussed with reference to FIGS. 6 through 16.

As discussed with FIG. 1, conventional cone pulley CVTs are provided with a hood 50, between which hood and the outer side of the support ring 8 there is a centrifugal oil chamber that exerts a force on the cone pulley 6, which counteracts the force resulting from pressure chambers 22 and 26. Due to increasing centrifugal forces with speed increase, the forces from the pressure chambers 22 and 26 exerted on the cone pulley 6 and pushing it toward the cone pulley 4 increase. These forces are counteracted by the pressure underneath the centrifugal oil hood 50 to compensate for influences on speed. The cone pulley CVT design having a centrifugal oil chamber and an additional oil pressure chamber is intricate. In the following, solutions are presented to compensate for influences on speed in a more simple and operationally sound manner.

Figure 6B:
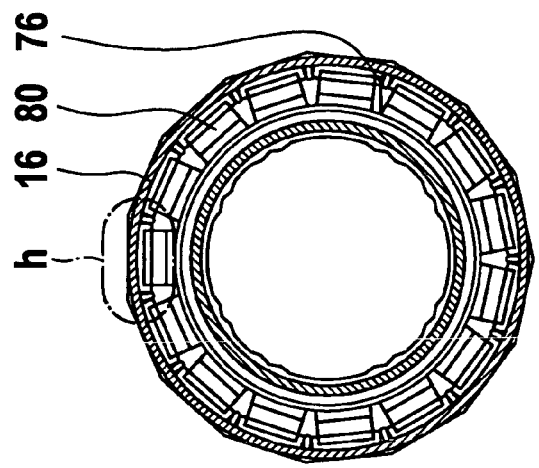
Figure 6A:
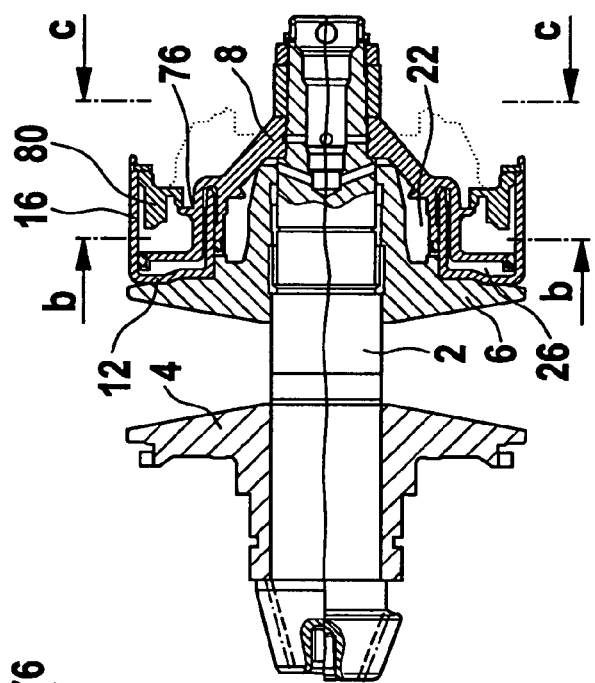

FIG. 6*a* shows a sectional view through a cone pulley pair of a cone pulley CVT, wherein components of a like function have been assigned the same previous reference designations.

As is apparent, a mass body 80 is pivotally mounted between the free end of the outer annular wall 16 of the annular wall structure 12 and a shoulder 76 of the support ring 8, wherein the center of gravity of this mass body relative to the pivot points is positioned in such a way that according to FIG. 6*a*, an upward centrifugal force tends to turn the mass body 80 clockwise, i.e., moving the outer annular wall 16 and also the axially movable cone pulley 6 to the right, against the pressure forces from the pressure chambers 22, 26. The centrifugal force increases as speed increases, so that with increasing speed, an increasing pressure is compensated for in the pressure chambers.

Figure 6C:
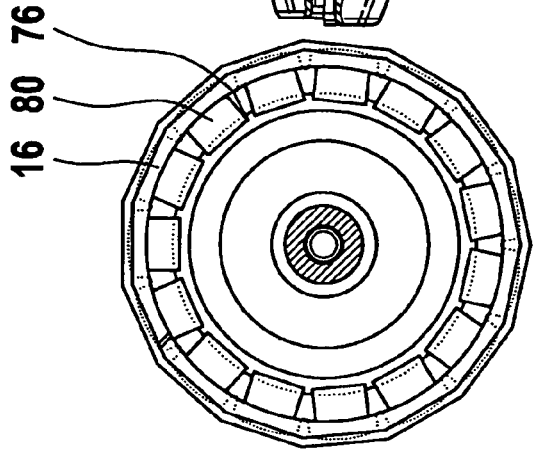

FIG. 6*b* is a sectional view through the assembly according to FIG. 6*a* in the plane b-b. FIG. 6*c* is a front view of the assembly according to FIG. 6*a* viewed in the direction of the arrows c-c. As is apparent, several mass bodies 80 are distributed along the circumference of the outer annular wall 16 and the shoulder 76. It is understood that the mass bodies 80 must only be positioned at the shoulder 76 or preferably on the annular wall 16, for example, by means of a spring ring attached to the annular wall.

Figure 6D:
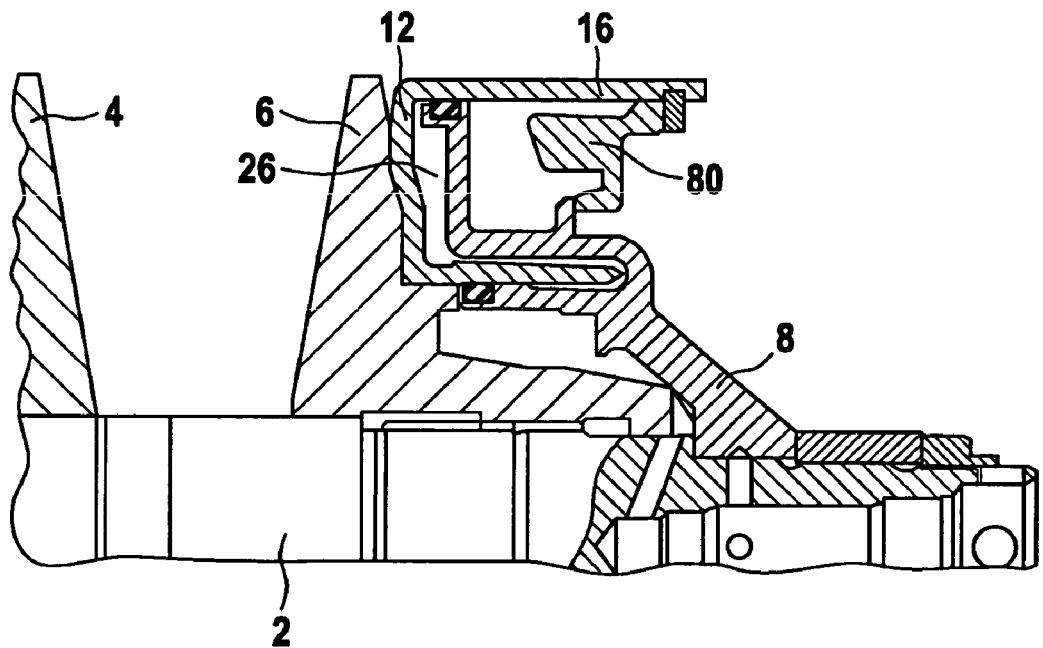
Figure 6E:
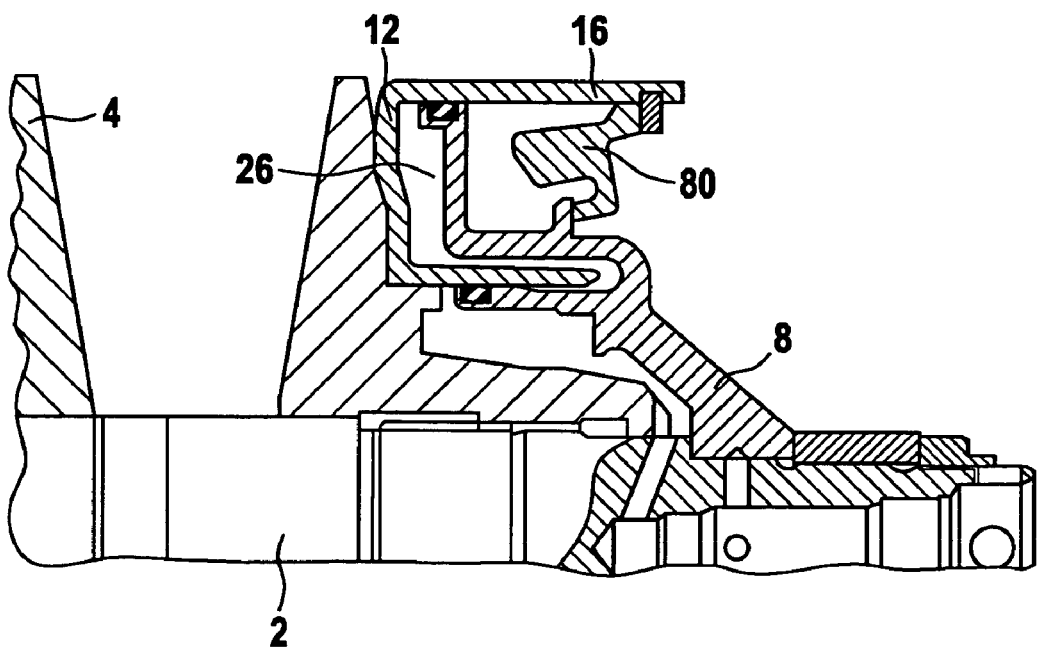
Figure 6F:
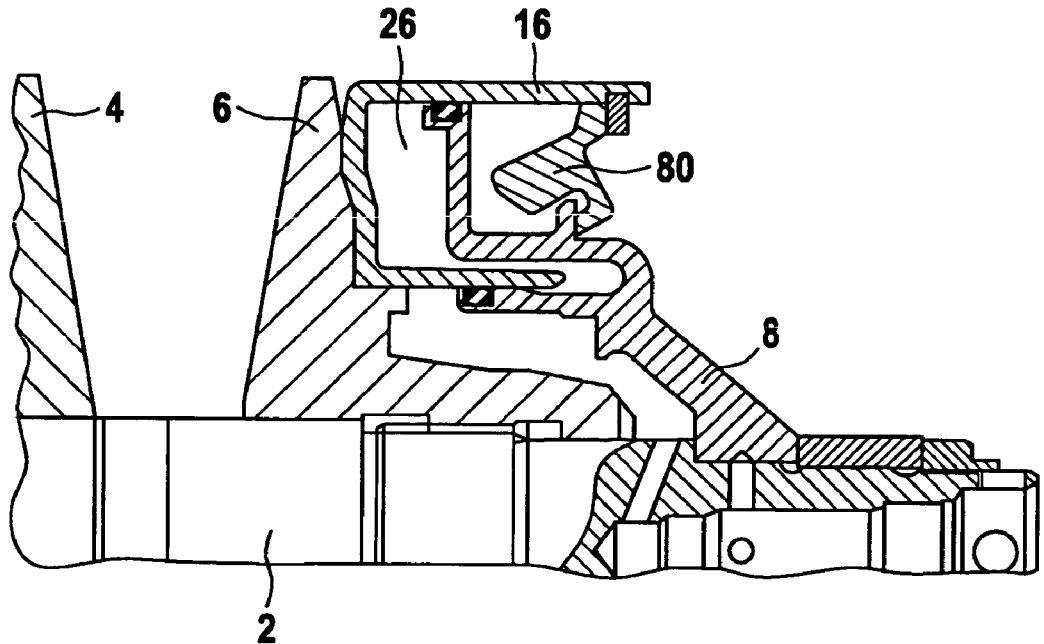
Figure 6G:
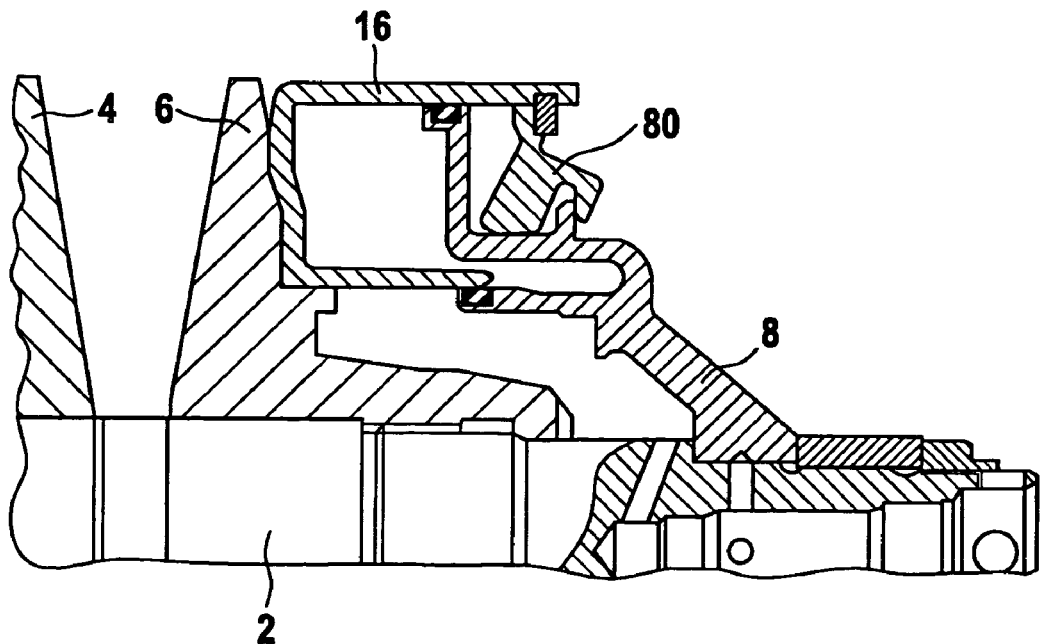
Figure 6H:
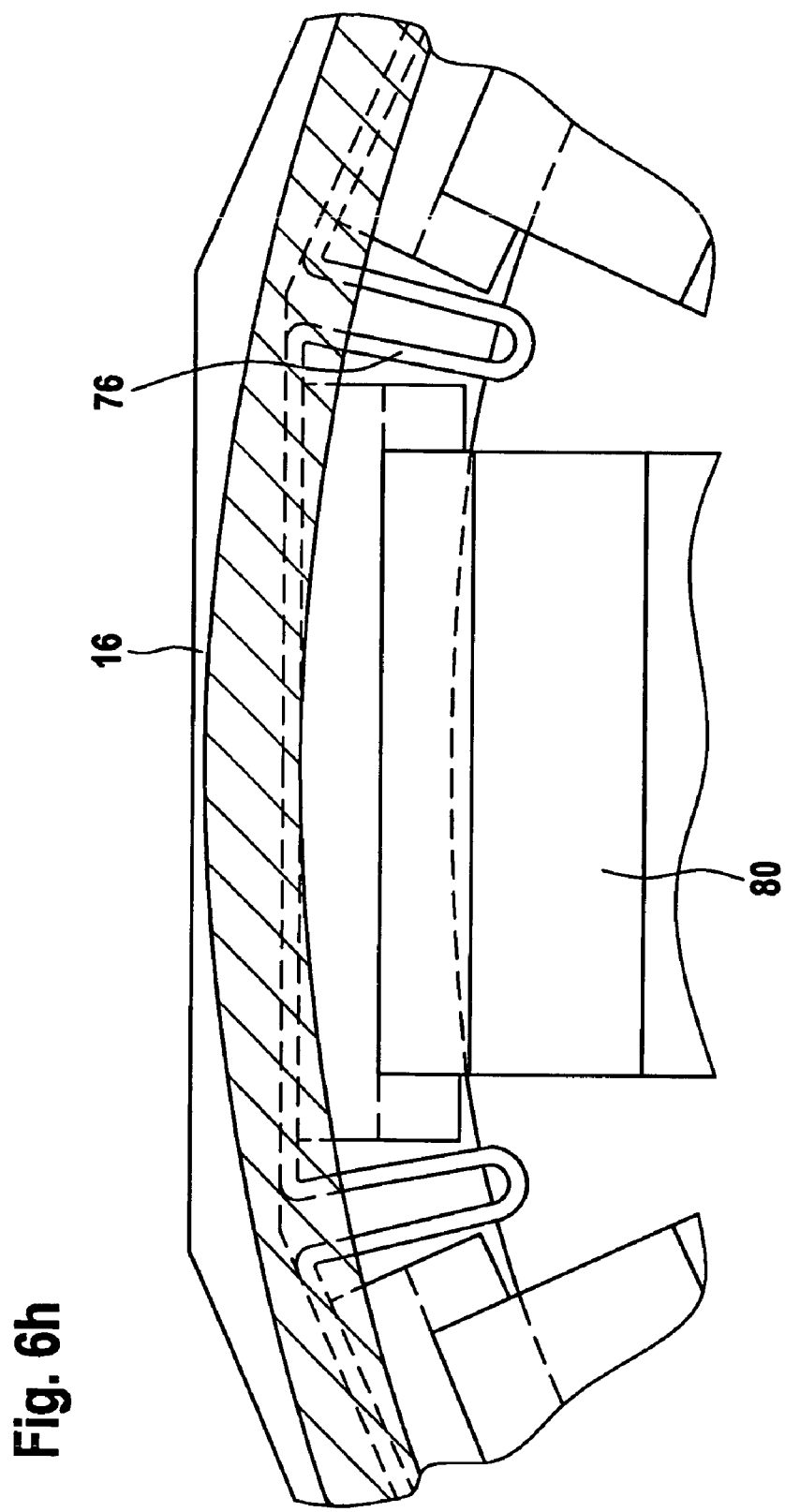

FIG. 6*d* shows the assembly in the overdrive position of the cone pulleys, FIG. 6*e* in top drive position, FIG. 6*f* at a transmission ratio of 1:1, and FIG. 6*g* in underdrive position. FIG. 6*h* is the enlargement of the cutaway view h of FIG. 6*b*. The mechanical solution has the following advantages over the hydraulic centrifugal force compensation:

It is more cost-efficient;
It requires less space in the mounting area (the dotted line in FIG. 6*a* indicates the required space for a hydraulic solution);
Pressure oil or hydraulic medium consumption is reduced;
Mechanical pressure (a compression spring) is no longer necessary for towing, as the axially movable cone pulley is pulled away from the axially fixed pulley, due to the centrifugal force and by the endless torque-transmitting means during towing;
The form and weight of the mass body, which forms a lever in the illustrated example, may be selected as required;
The principle of mechanical centrifugal force compensation may also be used, e.g. for a torque sensor;
Mechanical centrifugal force compensation is always active; filling of the centrifugal oil chamber is not necessary;

In the subsequent drawings, the upper half shows the overdrive position (maximum possible pulley spacing) and the lower half shows the underdrive position of the axially movable cone pulley 6 (minimum cone pulley spacing).

In the embodiment according to FIG. 7, the mass body 80 is fastened at a pivot point 82, wherein two levers 84 and 86 are pivotally connected, which are pivoted at 82 and 90 on the radial outer edge of the support ring 8 and the outer end of the annular wall 16. As can be seen, with increasing centrifugal force F the levers 84 and 86 tend to move to the extended position, by which a force that increases with the centrifugal force according to FIG. 7 is exerted on the cone pulley 6 to the right. It is understood that, as well as in the subsequent embodiment variations, several mass bodies 80 with associated levers are distributed around the circumference of the assembly.

FIG. 8 shows a modified embodiment wherein the mass body 80 is movably mounted in a radially outwardly oriented compartment 92 that is fastened to the support ring 8, and through a cable 94 that is connected to the annular wall 16 by rollers 98 that are mounted to the compartment 92 or to a lug 96 of the support ring 8. It can be clearly seen in FIG. 8 that there is a line of force toward the right on the cone pulley 6 that is rigidly connected to the annular wall 16, as the centrifugal force F acting on the mass body 80 increases.

Figure 9:
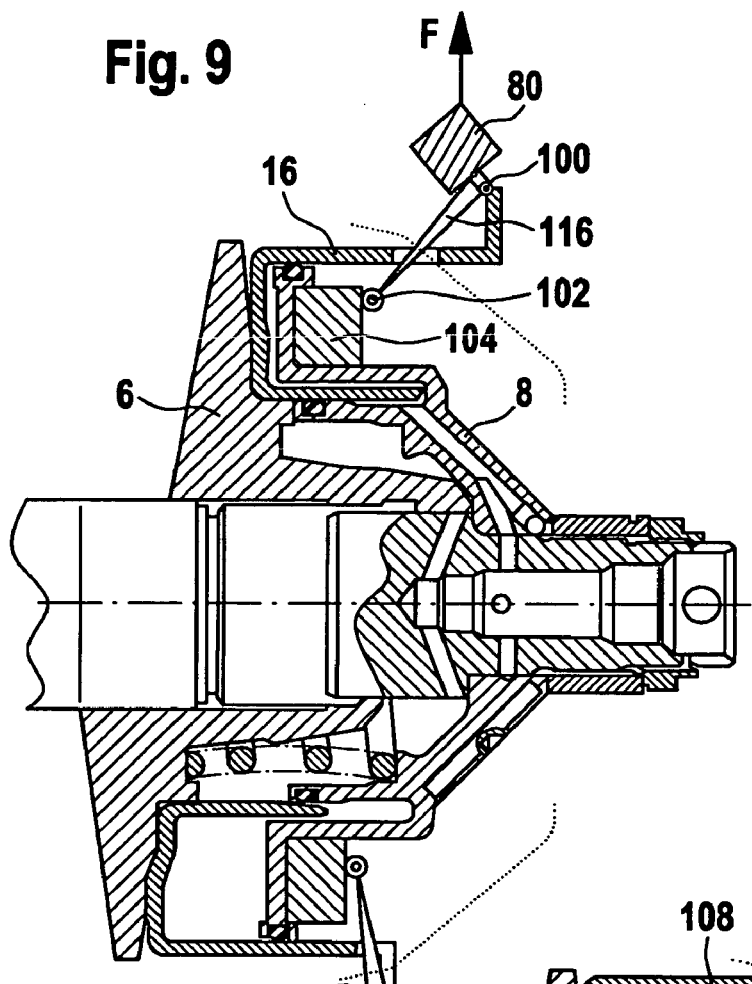

In the embodiment illustrated in FIG. 9, the mass body 80 is fastened to a lever 116 in such manner that it, with increasing centrifugal force F, pushes the lever, which is pivoted at location 100 on the annular wall and rests on a surface 104 of the support ring 8 over a roller 102, exerting an increasing clockwise force that causes the cone pulley 6 to be forced to the right.

Figure 10:
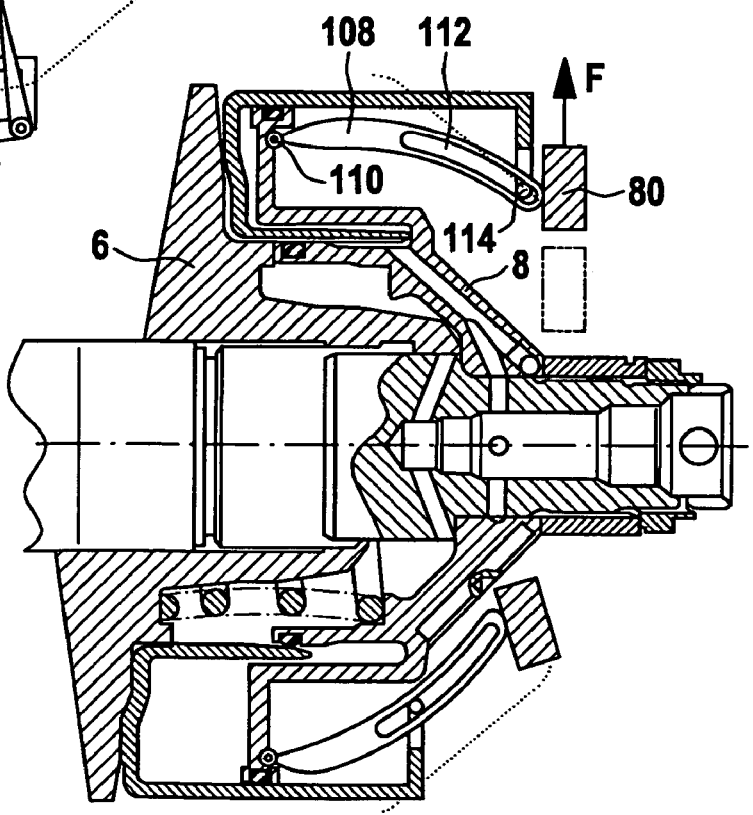

In the embodiment illustrated in FIG. 10, the mass body 80 is mounted at the end of a lever 108, which is pivoted on the support ring 8 at location 110 and has a longitudinal slot 112 or groove extending from the left top to the right bottom, in which a pin 114 runs, that is fastened to the free end of the annular wall 16. It clearly shows that the centrifugal force F in this embodiment also causes a rightward force to act on the cone pulley 6.

Figure 11:
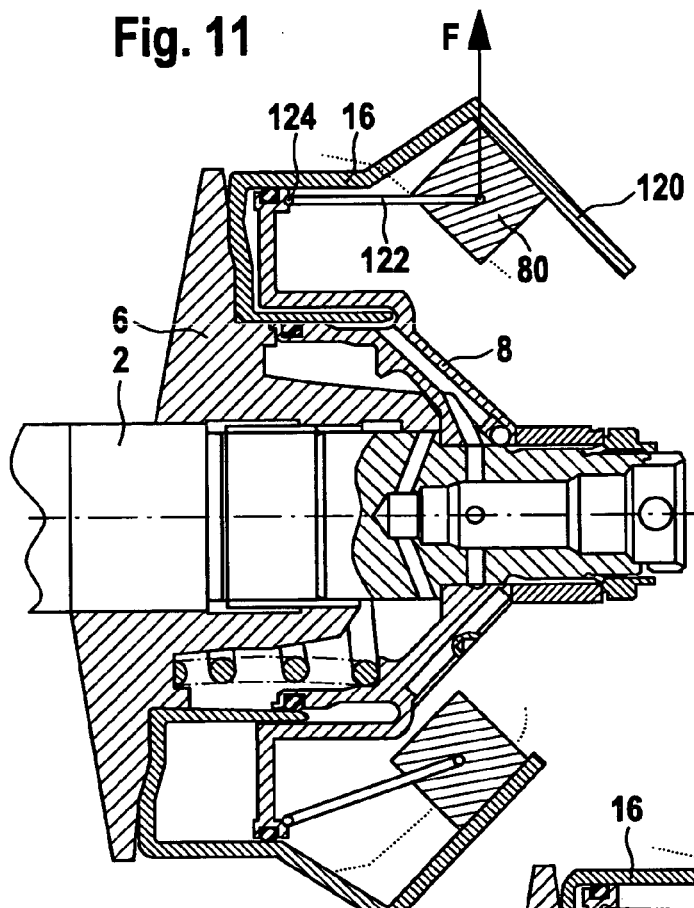

In the embodiment illustrated in FIG. 11, the annular wall 16 ends in a radially inwardly inclined plane 120, along which the mass body 80 that is pivotally mounted at location 124 on the support ring 8, is movable via a lever or a rod 122. As is clearly shown, the inclined plane 120 is pressed against the mass body 80, due to the force from the pressure chambers applied leftward onto the cone pulley 6. With increasing centrifugal force F, the mass body 80, which tends to move radially outward along the inclined plane 120, counteracts this force. It is understood that the inclined plane 120 may be designed as a cone-shaped hood around the shaft 2, against which several mass bodies 80 rest, that are distributed around the circumference.

Figure 12:
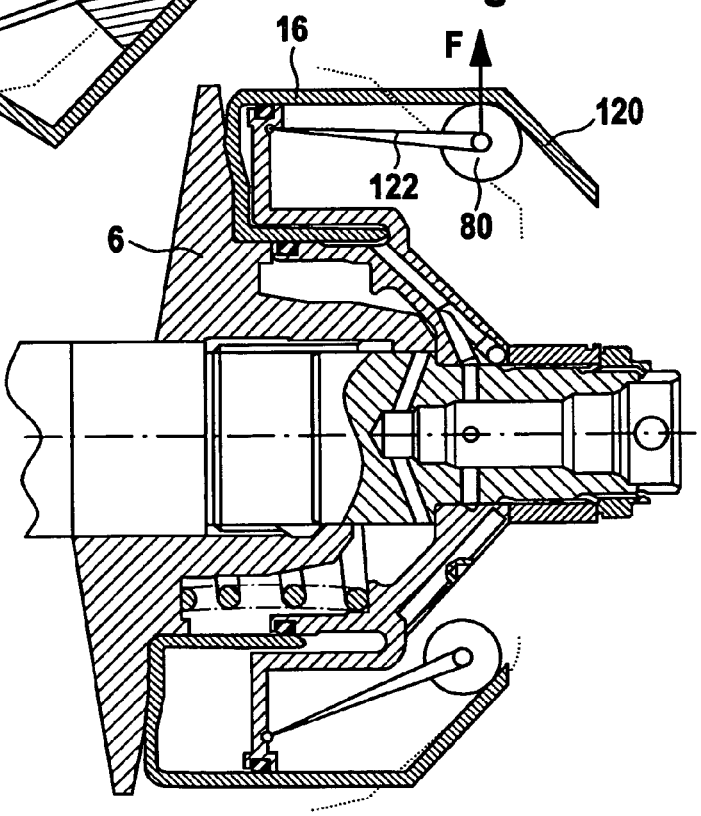

The embodiment illustrated in FIG. 12 is identical to FIG. 11, except that the mass body 80 is designed as a ball that may be rigidly connected to the rod 122 or be mounted at the rod 122. It is understood that the ball may be substituted by a cylinder or by a mass body having a convex surface toward the inclined plane 120.

Figure 13:
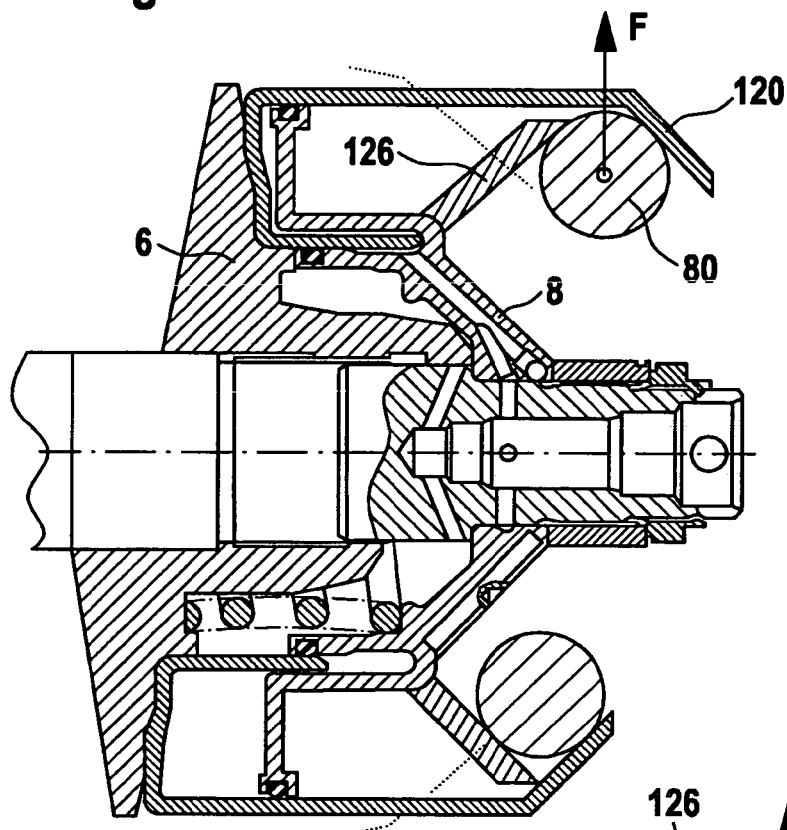

In the embodiment illustrated in FIG. 13, another inclined plane 126 or a conically extending hood is mounted to the support ring 8 in addition to the inclined plane 120 at the end of the annular wall 16. The mass body 80, which in this example is a ball, is mounted between the inclined planes 120 and 126, which extend radially outward toward one another. As can be seen, due to the centrifugal force F, the mass body 80 tends to move the inclined plane 126 away from the inclined plane 120, which results in a rightward force being applied to the cone pulley 6.

Figure 14:
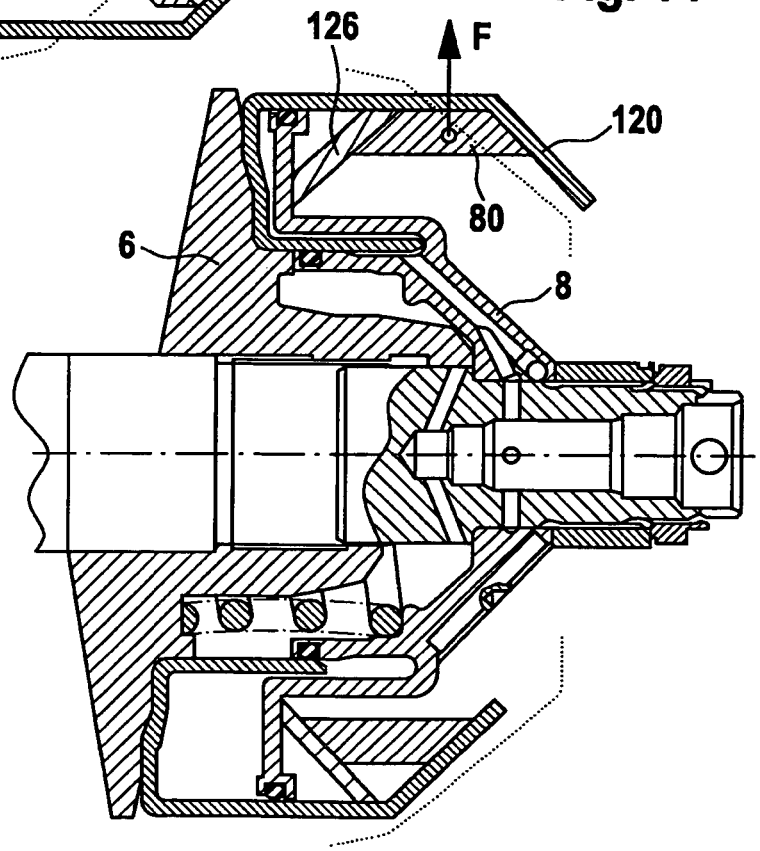

The embodiment illustrated in FIG. 14 is identical to FIG. 13, except that the mass body 80 is not a ball, but is trapezoidal in cross-section, wherein the incline of the lateral surfaces of the trapezoid equals the incline of the inclined surfaces 120 or 126. The function of the assembly illustrated in FIG. 14 is identical to the one in FIG. 13.

Figure 15:
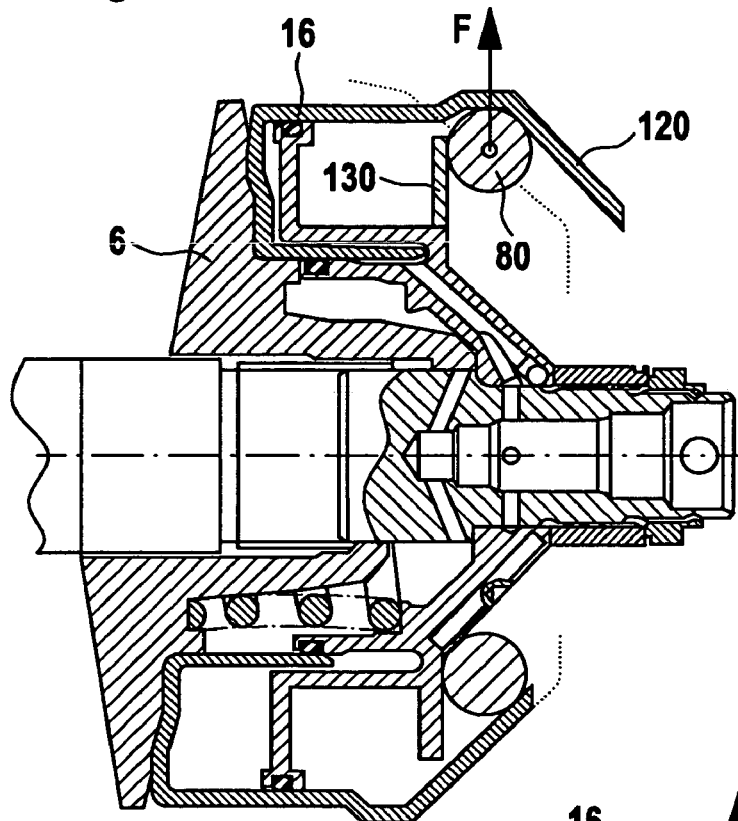

The embodiment illustrated in FIG. 15 is identical to FIG. 13, except that the inclined surface 126 is replaced by a radially extending surface 130.

Figure 16:
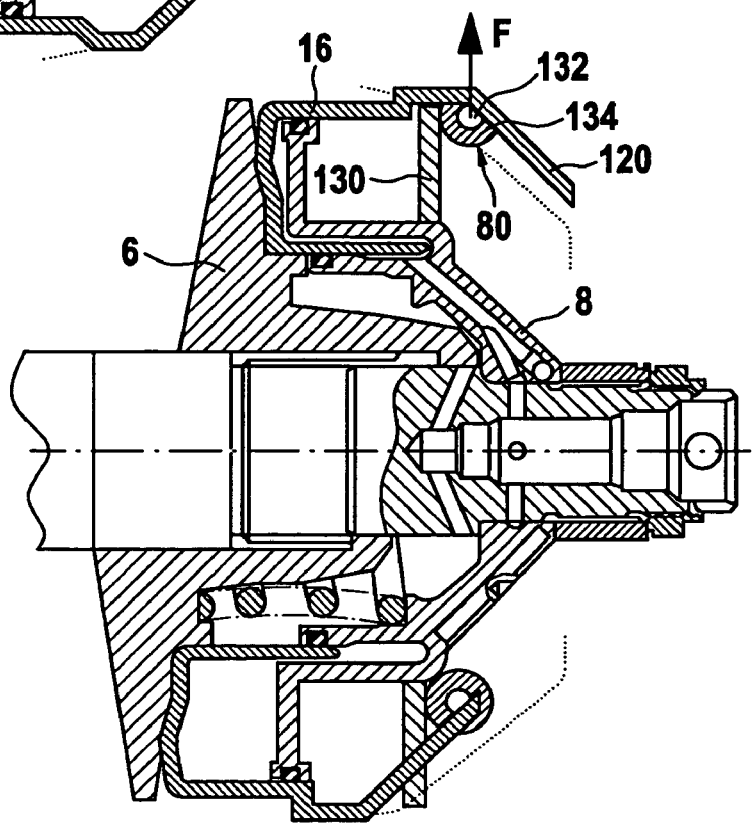

The embodiment illustrated in FIG. 16 is identical to FIG. 15, except that the mass body is in the form of an inner cylinder and an outer cylinder, wherein the inner cylinder is inserted into the outer cylinder 134 as a shaft 132. The inner cylinder or shaft 132 is somewhat longer than the outer cylinder 134 and rests on the inclined surface 120, which is rigidly connected to the cone pulley 6, while the outer cylinder rests on the radial wall 130, which is rigidly connected to the support ring 8. With the mass body formed by the two components it is achieved that the mass body acts as a slide bearing, although with friction, as the shaft 132 can turn relative to the outer cylinder 134.

Figure 17:
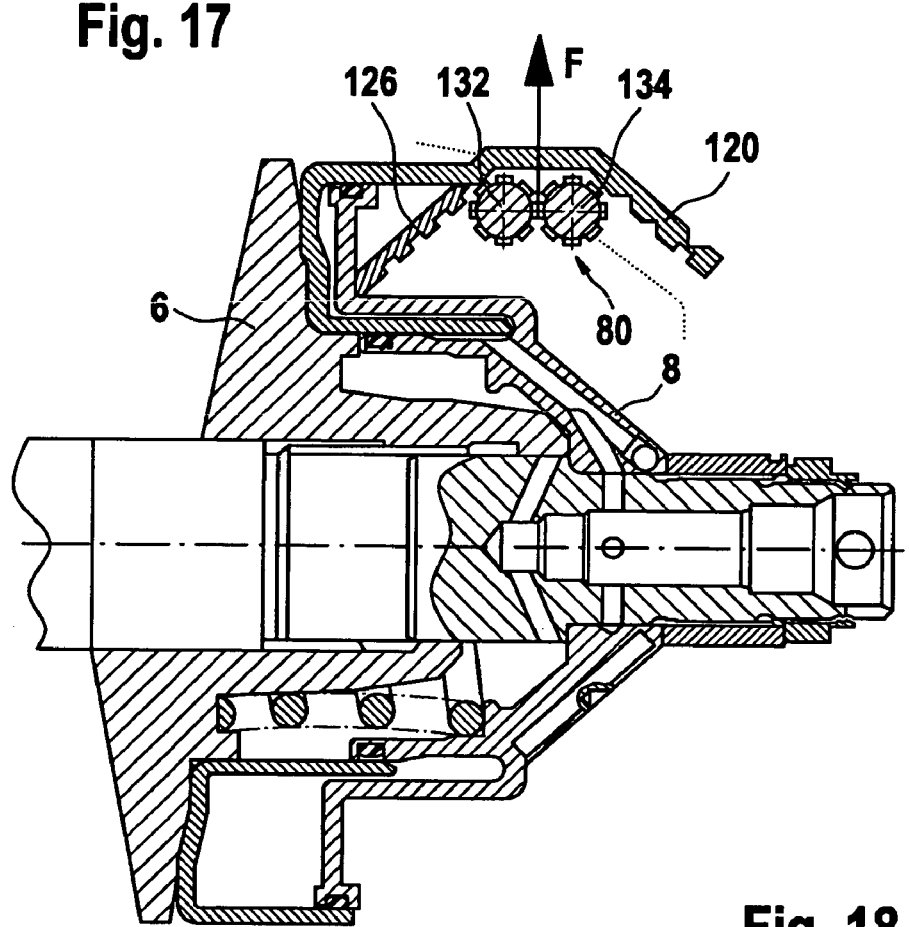

The embodiment illustrated in FIG. 17 is identical to FIGS. 13 and 14, except that the mass body is provided as two intermeshing gears 132 and 134, and that the inclined surfaces 120 and 126 are provided with teeth that engage with the teeth of the gears 132 and 134. This will prevent sliding as compared with FIGS. 13 and 14.

Vehicles equipped with cone pulley CVTs must also be towable, e.g. when the transmission hydraulics is defective. As a known method, the axially movable cone pulleys are pushed toward the axially fixed pulleys by means of springs, so that the endless torque-transmitting means is in friction-locking contact pressure with the cone pulleys and does not slip. A spring of this kind may be e.g. the spring 52 in FIG. 1.

According to the invention, towing, i.e. driving the output cone pulley pair, is performed in a different way by the vehicle. In the case of hydraulic pressure failure, the cone pulleys of at least one cone pulley pair, preferably the cone pulley pair on the output side, are separated from one another in such a manner that the endless torque-transmitting means or the endless chain slides on the drive shaft of the cone pulley CVT that is preferably on the output side, and turns with the wheels of the towed vehicle.

An advantage over the conventional solution is that the endless chain assumes a well-defined position, independently of the towing speed. This allows easy and low-cost implementation.

Figure 18:
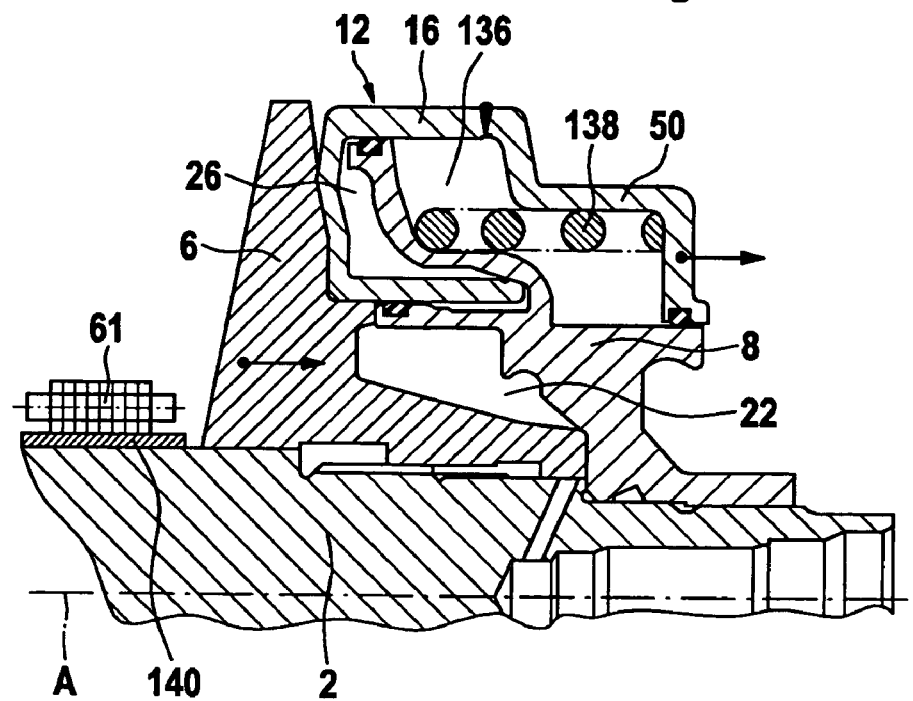
FIG. 18 shows a portion of a cone pulley pair with a spring to increase the spacing between the cone pulleys.

FIG. 18 is a view similar to that of FIG. 1 and shows a cutaway view of a cone pulley pair on the output side of such an embodiment. The annular wall structure 12 is rigidly connected to the cone pulley 6, which is movable axially relative to the shaft. An inner pressure chamber 22 is formed between the cone pulley 6 and the support ring 8. An outer pressure chamber 26 is formed between the support ring 8 and the wall structure 12. The annular wall 16 of the wall structure 12 is extended above a hood 50, which has a sliding seal facing a surface of the support ring 8, so that another chamber 136 is formed. In the chamber 136 a spring 138 rests between the support ring 8 and the hood 50, which pushes the hood 50 and simultaneously the axially movable cone pulley 6, in the direction of the arrows, i.e., away from the axially fixed pulley that is rigidly connected to the shaft 2 (not shown). In a functional hydraulic system, the pressure in the pressure chambers 22 and 26 overpressures the spring 138. When the hydraulic system fails, the spring 138 moves the axially movable cone pulley 6 rightward as shown in the drawing, so that the endless chain 61 comes into immediate contact with an outer surface of the shaft 2 and can slide on it with favorable friction. It is advantageous to apply a coating 140 of lubricant to the outer surface of the shaft 2, at least in this area, to reduce friction and increase durability.

Figure 19:
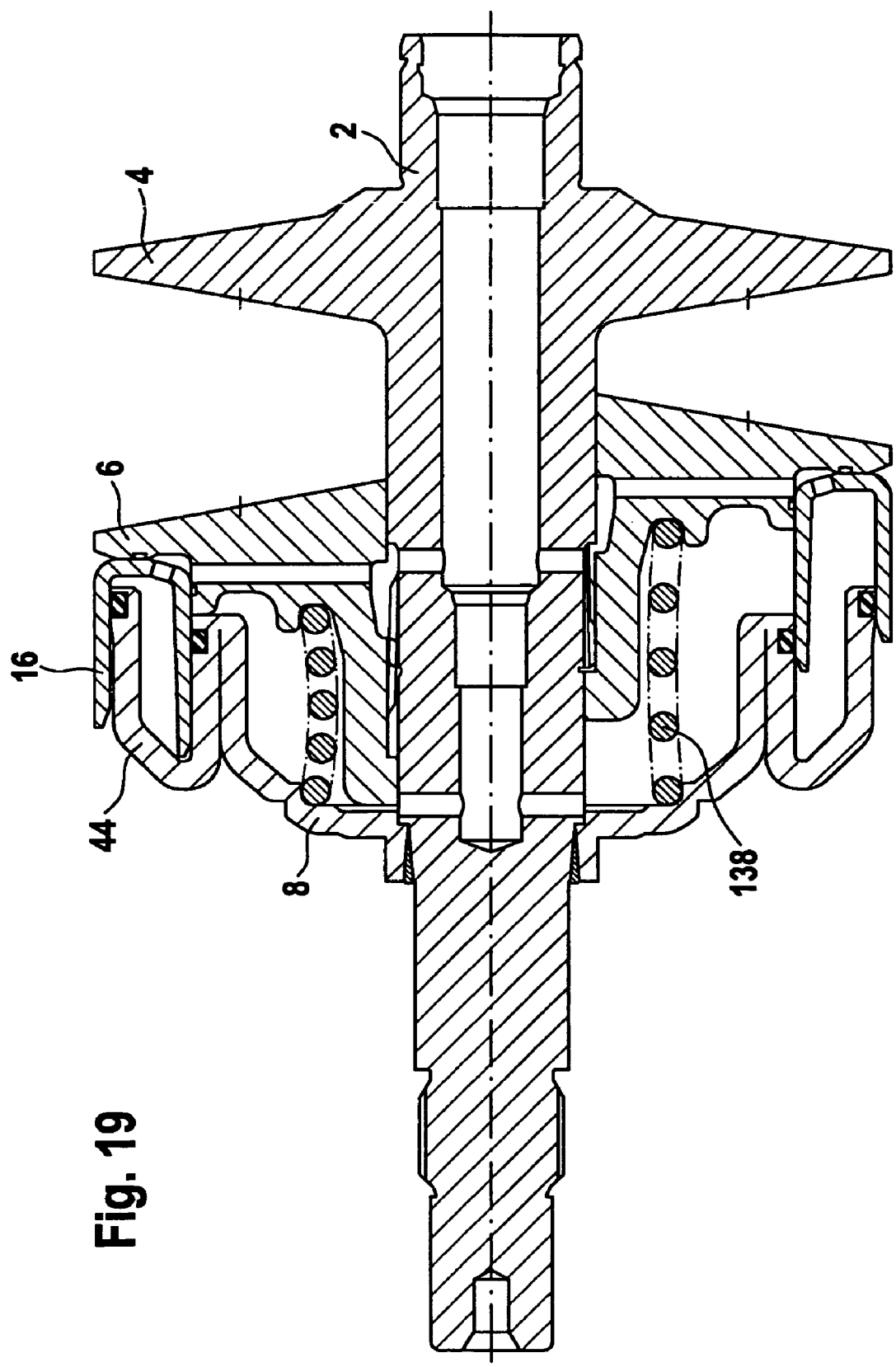
FIG. 19 shows a cone pulley pair on the input side according to the invention.

FIG. 19 shows a cone pulley pair on the input side according to the invention. In this embodiment, the support ring 8 and the outer ring component 44 are combined as a single component.

Figure 20:
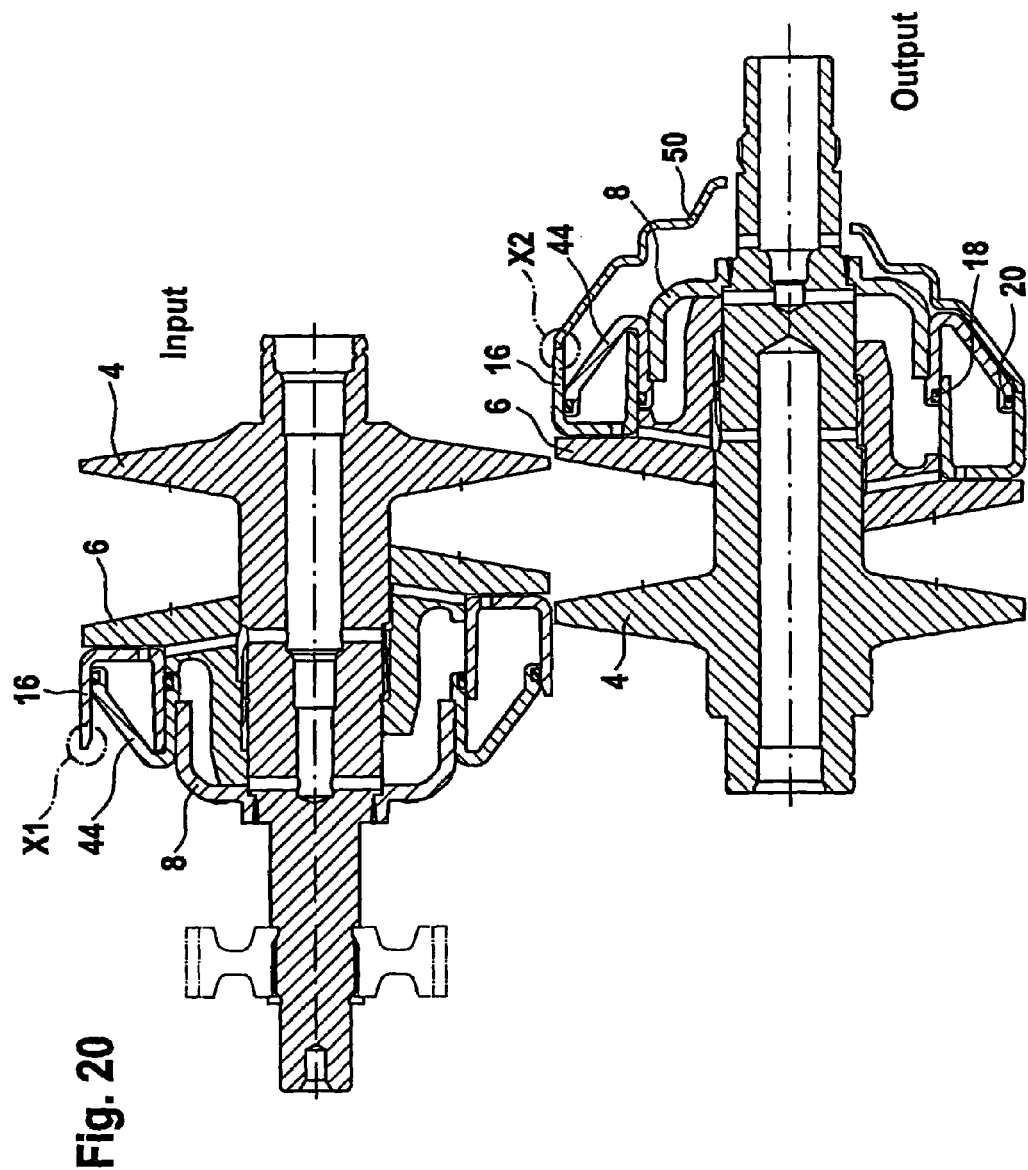
FIG. 20 shows a complete cone pulley CVT according to the invention.

A complete cone pulley CVT is illustrated in FIG. 20. It can be seen that the components, such as the support ring 8, the outer ring component 44, the ring wall 16, and the axially movable cone pulley 6 are identical in construction. The mounting location of the hood 50 is optional on either pulley pair. If the set of pulleys is not provided with a cover in the form of the hood 50, the end of the annular wall 16 has a bevel according to region X1.

If the set of pulleys is covered with the hood 50, according to region X2, an appropriate recess, e.g. in form of a groove that matches the wall thickness of the hood 50, must be provided at the end of the annular wall 16.

It is understood that the described design may be modified in many ways and that it is not restricted to systems that operate with two pressure chambers.

In the event of pressure failure, only the pulleys of the cone pulley pair on the output side (preferred solution) may be moved away from one another, or those of the cone pulley pair on the input side or those of both cone pulley pairs may be moved away from one another. For moving the cone pulleys of a cone pulley pair away from one another, a spring may be used, e.g. a coil spring (as illustrated), or a cup spring, etc., which acts at the appropriate location between the shaft or the support ring and the cone pulley or a component that is axially rigidly connected to the cone pulley. For pulling back the cone pulley, instead of a spring, or in addition to a spring, a system may be used that operates with centrifugal force (similar to the one in FIGS. 6 to 17), and/or an additional hydraulic system may be used, that e.g. pressurizes the chamber 136.

The patent claims submitted with the application are wording suggestions without prejudice to obtaining continued patent protection. The applicant reserves the right to claim further feature combinations that have been disclosed only in the description and/or drawings.

Back-references used in dependent claims refer to the further development of the subject matter of the main claim through the features of the respective dependent claim; they shall not be construed as a waiver of obtaining independent, objective protection for the feature combinations of the back-referenced dependent claims.

Since the subjects of the dependent claims with respect to state-of-the-art technology on the priority date may form own and independent inventions, the applicant reserves the right to make them the subject of independent claims or declarations of division.

They may continue to contain independent inventions that present a design that is independent of one of the subjects of the previous dependent claims.

The exemplary embodiments shall not be deemed a restriction of the invention. Rather, numerous variations and modifications are possible within the framework of the present disclosure, particularly such variants, elements and combinations and/or materials that by combination, modification of individual features, elements or procedural steps, in connection with those discussed in the general description, embodiments and claims and included in the drawings may be gathered by a person skilled in the art and may, through combinable features, lead to a new subject or to new procedural steps or procedures, including manufacturing, testing and operating methods.

What is claimed is:

1. Cone pulley continuously variable transmission (CVT) comprising:
   a shaft,
   a first cone pulley that is integral with the shaft,
   a second cone pulley that is non-rotatably connected to the shaft and in an axially movable manner,
   a support ring that is axially immovably mounted to the shaft at a distance from a rear side of the axially movable cone pulley,
   a radially inner pressure chamber that is formed between the axially movable cone pulley and the support ring, wherein the inner pressure chamber is variable in the axial direction and is pressurized through a first passageway in the shaft for axially moving the axially movable cone pulley, and
   a radially outer pressure chamber that is variable in an axial direction and is pressurized through a second passageway in the shaft for axially moving the axially movable cone pulley,
   wherein the second passageway inside the shaft is connected to the radially outer pressure chamber via a passageway in the axially movable cone pulley, and
   wherein the inner and outer pressure chambers are separated from each other by an axially-extending cylindrical annular wall.

2. Cone pulley CVT according to claim 1, wherein the second passageway in the shaft extends into an annulus located between the axially movable cone pulley and the shaft and communicates with the passageway in the movable cone pulley.

3. Cone pulley CVT according to claim 1, wherein the support ring includes a radially inner and a radially outer ring component, with surfaces of the radially outer ring component bordering the radially outer pressure chamber.

4. Cone pulley CVT according to claim 3, wherein the ring components are integrally formed.

5. Cone pulley CVT according to claim 4, wherein the radially outer ring component is pushed form-fittingly onto the radially inner ring component when the radially outer pressure chamber is pressurized.

6. Cone pulley CVT according to claim 3, wherein the ring components are formed sheet-metal pieces that are press-fit connected to one another.

7. Cone pulley CVT according to claim 3, wherein a coil spring without surface-ground, substantially flat coil ends is positioned between the radially inner ring component and the cone pulley.

8. Cone pulley CVT according to claim 1, wherein a hood is mounted on at least one of an input and an output pulley set.

9. Cone pulley CVT according to claim 8, wherein an end of the annular wall receives the hood.

10. Cone pulley CVT according to claim 9, wherein the support ring is welded to the shaft.

11. Cone pulley CVT according to claim 9, wherein the support ring is axially form-fittingly fixed to the shaft by at least one component that engages in a recess located in the outer circumference of the shaft and a recess located in an inner circumference of the support ring.

12. Cone pulley continuously variable transmission (CVT) comprising:
    a shaft,
    a first cone pulley that is integral with the shaft,
    a second cone pulley that is non-rotatably connected to the shaft and in an axially movable manner,
    a support ring that is axially immovably mounted to the shaft at a distance from a rear side of the axially movable cone pulley,
    a radially inner pressure chamber that is formed between the axially movable cone pulley and the support ring, wherein the inner pressure chamber is variable in the axial direction and is pressurized through a first passageway in the shaft for axially moving the axially movable cone pulley, and
    a radially outer pressure chamber that is variable in an axial direction and is pressurized through a second passageway in the shaft for axially moving the axially movable cone pulley,
    wherein the second passageway inside the shaft is connected to the radially outer pressure chamber via a substantially radial passageway in the axially movable cone pulley, and
    wherein the radially outer pressure chamber is bordered toward the axially movable cone pulley by a floor of an annular wall structure with an inner and an outer axial annular wall, said annular walls being sealed and axially movable relative to the support ring, and the passageway in the axially movable cone pulley communicates with the radially outer pressure chamber through an opening in the annular wall structure.

13. Cone pulley CVT according to claim 12, wherein the axially movable cone pulley, the support ring, the outer annular wall, and the outer annular component are identical in construction for input and output sides of the transmission.

* * * * *